United States Patent
Bhattacharyya et al.

(10) Patent No.: US 9,678,854 B2
(45) Date of Patent: Jun. 13, 2017

(54) APPLICATION-CENTRIC ANALYSIS OF LEAK SUSPECT OPERATIONS

(71) Applicant: International Business Machines Corporation, Armonk, NY (US)

(72) Inventors: Anamitra Bhattacharyya, Chelmsford, MA (US); Krishnamohan Dantam, Chelmsford, MA (US); Ravi K. Kosaraju, Pittsford, NY (US); Manjunath D. Makonahalli, Acton, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 74 days.

(21) Appl. No.: 14/713,083

(22) Filed: May 15, 2015

(65) Prior Publication Data

US 2016/0335169 A1 Nov. 17, 2016

(51) Int. Cl.
*G06F 11/00* (2006.01)
*G06F 11/36* (2006.01)

(52) U.S. Cl.
CPC ........ *G06F 11/3612* (2013.01); *G06F 11/366* (2013.01); *G06F 11/3608* (2013.01)

(58) Field of Classification Search
CPC .................. G06F 11/3608; G06F 11/3612
USPC ................. 714/38.1, 38.11, 38.12, 38.13, 37
See application file for complete search history.

(56) References Cited

U.S. PATENT DOCUMENTS

| | | | | |
|---|---|---|---|---|
| 5,408,650 A | * | 4/1995 | Arsenault | G06F 11/323 345/502 |
| 8,359,450 B2 | | 1/2013 | Crosby et al. | |
| 2005/0076184 A1 | * | 4/2005 | Schumacher | G06F 11/0751 711/170 |
| 2006/0095427 A1 | * | 5/2006 | Dickenson | G06F 11/362 |
| 2006/0155949 A1 | * | 7/2006 | Purushothaman | G06F 9/5016 711/170 |
| 2008/0270994 A1 | * | 10/2008 | Li | G06F 11/366 717/128 |

OTHER PUBLICATIONS

Maxwell et al., Diagnosing Memory Leaks using Graph Mining on Heap Dumps, KDD '10 Proceedings of the 16th ACM SIGKDD international conference on Knowledge discovery and data mining, pp. 115-124.

* cited by examiner

*Primary Examiner* — Dieu-Minh Le
(74) *Attorney, Agent, or Firm* — Garg Law Firm, PLLC; Rakesh Garg; Richard A. Wilhelm

(57) ABSTRACT

To identify a source of a memory leak in an application, a pattern of objects is identified in an object hierarchy of a heap dump, the pattern including an indication of the memory leak. The pattern is matched with a metadata of the application. A static entry in the metadata describes a relationship between a component of the application and an object of a class used in the component. A flow entry in the metadata describes a relationship between a pattern of instantiation of a set of objects corresponding to a set of classes and an operation performed using the application. When the pattern matches the flow entry in the flow section of the metadata, a conclusion is drawn that the memory leak is caused in the operation identified in the flow entry. A portion of a code that participates in the operation is selected for modification.

18 Claims, 6 Drawing Sheets

*FIGURE 3* heapdump.20140414.112530.5744.0005.phd.hpr Tree View

- ▼ Leak Suspect(s) Suspects by Category [other tabs]
- ▼ ◯ 3,940,020,424 (91.74%) [40] 1 java/util/Hashtable 0x975a0c98
  - ▼ ◯ 3,940,020,384 (91.74%) [112] 10 array of java/util/Hashtable$Entry 0x98f5a28
    - ▼ ◯ 3,940,019,736 (91.74%) [32] 3 java/util/Hashtable$Entry 0x9d790ad0
      - ▼ ◯ 3,940,019,504 (91.74%) [32] 2 java/util/Hashtable$Entry 0x9789f1a60
        - ▼ ◯ 3,901,520,232 (90.85%) [184] 7 com/ibm/fvoli/maximotsvad/app/wo/WOSer...
          - ▼ ◯ 3,901,519,592 (90.85%) [40] 1 java/util/Hashtable 0x98928a28
            - ▼ ◯ 3,901,519,552 (90.85%) [64] 1 array of java/util/Hashtable$Entry 0x98931440
              - ▼ ◯ 3,901,519,488 (90.85%) [32] 2 java/util/Hashtable$Entry 0x98931440
                - ▼ ◯ 3,901,519,424 (90.85%) [400] 26 psdi/app/system/ALNValueSet 0x98931038
                  - ▼ ◯ 3,901,508,864 (90.85%) [48] 3 psdi/tmi/MXTransactionImpl 0x9953b2b8
                    - ▼ ● 3,901,508,672 (90.85%) [32] 1 java/util/Vector 0x9953b538
                      - ▼ ◯ 3,901,508,640 (90.85%) [656] 103 array of java/lang/Object 0x9617c860  ← 302, 306
                        - ▲ 10,896 (0%) [32] 3 psdi/tmi/MXTransactionImpl$TransactableInfo 0x9892aa30  ← 304
                        - ▲ 160 (0%) [32] 3 psdi/tmi/MXTransactionImpl$TransactableInfo 0x98880e40
                        - ▲ 160 (0%) [32] 3 psdi/tmi/MXTransactionImpl$TransactableInfo 0x98885bc8
                        - ▲ 160 (0%) [32] 3 psdi/tmi/MXTransactionImpl$TransactableInfo 0x98888a010
                        - ▲ 160 (0%) [32] 3 psdi/tmi/MXTransactionImpl$TransactableInfo 0x98888e340
                        - ▲ 160 (0%) [32] 3 psdi/tmi/MXTransactionImpl$TransactableInfo 0x98893020
                        - ▲ 160 (0%) [32] 3 psdi/tmi/MXTransactionImpl$TransactableInfo 0x98895d28

300

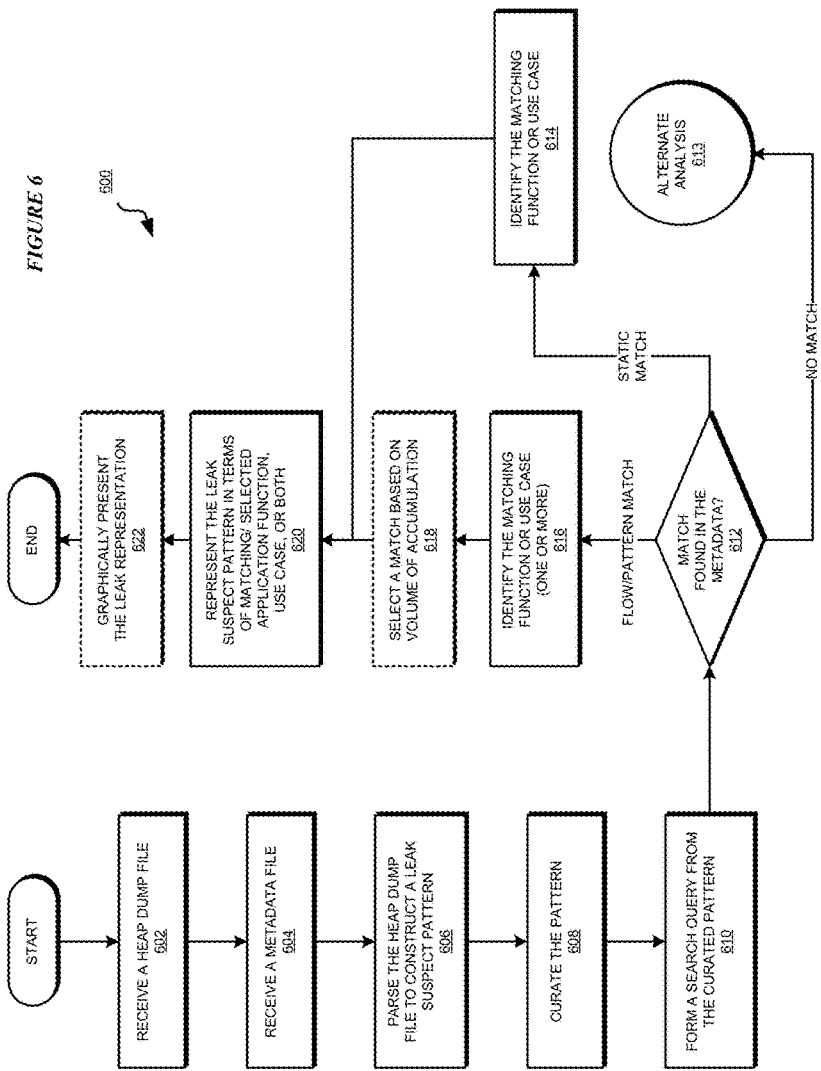

APPLICATION-CENTRIC ANALYSIS OF LEAK SUSPECT OPERATIONS

TECHNICAL FIELD

The present invention relates generally to a method, system, and computer program product for analyzing memory leaks in the operations of data processing systems. More particularly, the present invention relates to a method, system, and computer program product for application-centric analysis of leak suspect operations.

BACKGROUND

During execution, the executable code of an application requests the use of the memory available in the data processing system. Memory is allocated to an application for instantiating data structures, such as objects of a class, storage for variable data, temporary storage of data during computations, and for many other purposes.

The memory management subsystem of the data processing system expects that application to release any unused memory that was allocated to the application. Ideally, the application should promptly request memory as needed, release any unused memory during the operations, and no memory should remain allocated to the application when the application terminates.

Many applications allocate too much memory before releasing any unused memory, or fail to release unused memory. Over-allocation of memory to an application can cause memory shortage for other applications. Failure to release unused memory has similar results. In some cases, the memory management subsystem exhausts a threshold amount of allocable memory resulting in delays, disruptions, or even failures in other applications executing on the data processing system.

An actual memory leak is the phenomenon in a data processing system where the available pool of allocable memory is depleted by allocating more and more memory to an application without receiving back unused memory from the application. Over-allocation of memory, to wit, allocation of memory above a threshold amount of memory to an application, can also look like a memory leak even though the application may be using all of the allocated memory. An actual memory leak or a leak-like over-allocation is collectively referred to hereinafter as "leak" or "memory leak".

SUMMARY

The illustrative embodiments provide a method, system, and computer program product for application-centric analysis of leak suspect operations. An embodiment includes a method for identifying a source of a memory leak in an application. The embodiment identifies a pattern of objects in an object hierarchy of a heap dump, the pattern including an indication of the memory leak. The embodiment matches, using a processor and a memory, the pattern with a metadata of the application, wherein a static entry in a static section of the metadata describes a relationship between a component of the application and an object of a class used in the component, wherein a flow entry in a flow section of the metadata describes a relationship between a pattern of instantiation of a set of objects corresponding to a set of classes and an operation performed using the application. The embodiment concludes, when the pattern matches the flow entry in the flow section of the metadata, that the memory leak is caused in the operation identified in the flow entry. The embodiment selects a portion of a code of the application for modification, wherein the portion of the code participates in the operation identified in the flow entry.

Another embodiment includes a computer usable program product comprising a computer readable storage device including computer usable code for identifying a source of a memory leak in an application.

Another embodiment includes a data processing system for identifying a source of a memory leak in an application.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 3 depicts a screenshot of an actual example heap dump using which a source of a leak in an application can be detected in accordance with an illustrative embodiment;

FIG. 6, this figure depicts a flowchart of an example process for application-centric analysis of leak suspect operations in accordance with an illustrative embodiment.

DETAILED DESCRIPTION

Figure 1:
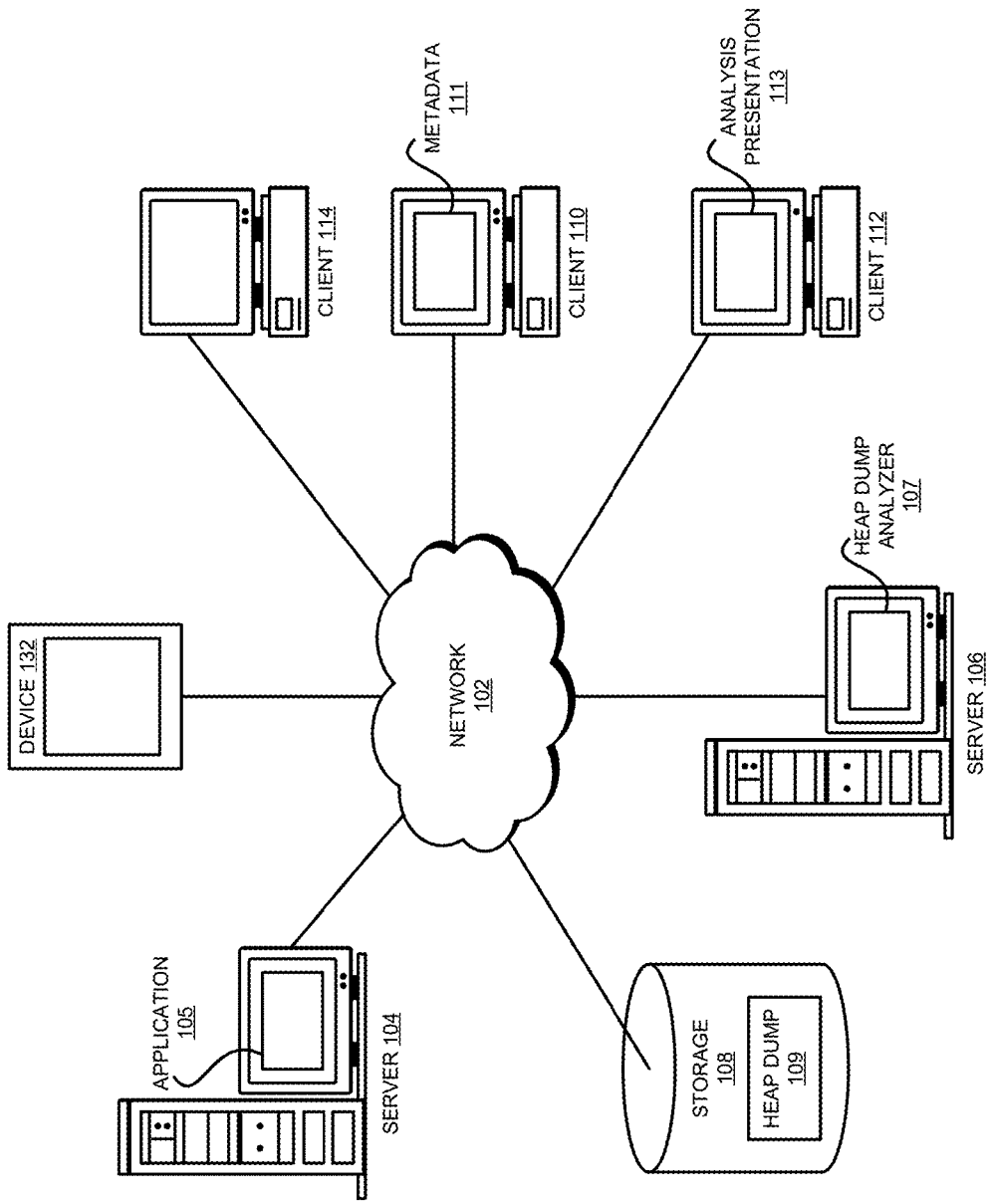
FIG. 1 depicts a block diagram of a network of data processing systems in which illustrative embodiments may be implemented.

A memory heap, or heap, is a commonly known manner of organizing allocable memory from which the memory management subsystem allocates memory to the various applications that request memory allocations. A heap dump is a process of capturing a state of the allocable memory at a given time. In other words, a heap dump is a snapshot of the state of the allocable memory in a data processing system at a given time. Hereinafter, "memory" refers to allocable memory in a data processing system unless expressly distinguished when used.

Memory leak is an undesirable occurrence in a data processing system. It is desirable to identify a cause of a memory leak and remedy that cause. Presently, when a leak is suspected, a dump of the heap is taken and analyzed to indentify a cause of the leak.

The illustrative embodiments recognize that leak detection using a heap dump is a very complex process, requiring significant expertise and investment of time. The data captured in a heap dump is cryptic, often bearing no resemblance to the functions and operations of the applications that use the memory.

A heap dump analyzer is a tool that is presently available for analyzing heap dumps. A heap dump analyzer typically arranges the heap data is a hierarchical form such that constructs such as container objects, parent-child relationships of objects, and the like are perceivable in the heap dump. A container class instance or object contains other class instances or objects.

The illustrative embodiments recognize that presently, even with the aid of heap dump analyzers, analyzing the heap dump and identifying a leak suspect operation can take up to several days of effort from individuals who are intricately familiar with the code of the applications holding memory allocations according the heap dump. A leak suspect operation is an operation, such as a function, a transaction, a sequence of events or computations, or some combination thereof, that lead to a memory leak in a data processing system.

The illustrative embodiments further recognize that the expertise and time required to perform the presently available heap dump analysis is often unavailable at the location of the data processing system, at the time of a leak, or both. For example, the illustrative embodiments recognize that when a data processing system is deployed in a customer's data processing environment, a consultant trying to troubleshoot a leak often does not have the level of knowledge of the code of an application as the developers of the application do. The developers of the application do not and cannot participate in on-site troubleshooting for a variety of reasons.

The illustrative embodiments further recognize that the expertise and time deemed necessary to perform the presently available heap dump analysis is sometimes not actually necessary. For example, the illustrative embodiments recognize that while the code of an application may not inherently contain a memory leak, a manner in which that code is used in a particular use-case can also give rise to a leak.

A use-case is a scenario of using an application or a component thereof. A use-case includes a sequence of operations, interactions, or transactions, performed with respect to an application.

As an example, if a use-case calls for storing a large amount of data in a data structure in an application, the application will likely exhibit leak-like symptoms under certain circumstances. The illustrative embodiments recognize that such leaks can be remedied by modifying the use-case to store less data, without requiring the knowledge of the code of the application.

The illustrative embodiments recognize that even if the hierarchies of objects can be visualized from a heap dump analyzer, the object names are often not indicative of application functions or use-case scenarios. In fact, many objects are references to other objects, and such referential redirections and indirections can lead to a very confusing hierarchy that is difficult to correlate to any feature or function of an application or to a use-case.

The illustrative embodiments recognize that the presently used heap dump analysis techniques require significant investment of expertise and time for brute force analysis each heap dump. Therefore, the illustrative embodiments recognize that the presently used heap dump analysis is ill-suited for detecting leak suspect operations in a variety of circumstances, some of which are described in the above examples.

The illustrative embodiments used to describe the invention generally address and solve the above-described problems and other problems related to determining the cause of a memory leak in a data processing system. The illustrative embodiments provide a method, system, and computer program product for application-centric analysis of leak suspect operations.

An embodiment creates metadata corresponding to an application, such as in the form of a metadata file. In a static portion of the metadata, the embodiment defines correlations between class names and application entities. An application entity can be a method or function, a data structure, an algorithm, a reference, data, or condition defined or used in the application. For example, if an application causes objects of classes A, B, and C to be instantiated, the static portion of the metadata of the application can define a correspondence or relationship between objects of classes A, B, and C, to one or more rows in one or more records in an inventory table, or to one or more messages present in a message queue, or to eXtensible Markup Language (XML) data.

As another example, consider an application entity that is a function. For example, if the application has an authentication function in which objects of classes A, B, and C are instantiated, the static portion of the metadata defines a correspondence or relationship between objects of class A with the authentication function. When the object hierarchy of the heap dump shows an object of class A, an analysis according to an embodiment concludes, based on the static metadata, that the object was instantiated as a result of executing the authentication function of the application.

As an example, a developer of the application can define the static metadata at the time of developing the code of the application. The developer can refine or modify the static portion as the code evolves later during the updates or upgrades of the application. A consultant can also define, refine, or modify the static metadata based on the customizations of the application, such as on customer site. Such metadata may also be entered by a user in some cases. Static metadata can also be generated by analyzing existing application metadata such as ORM mappings defined in an application configuration, a data dictionary for the application, the XML bean mappings, and other sources.

Any number of static relationships of a similar nature can be defined in the static portion of the metadata of an application. A static relationship can define a relationship between any number of objects and any number of functions in a similar manner.

The embodiment further constructs a dynamic portion, also referred to herein as a flow portion or a pattern portion, of the metadata. In the flow portion of the metadata, the embodiment defines correlations between referential relationships between two or more classes and an operation of an application. For example, an object of class A references an object of class B, which in turn references an object of class C, and the like. The order of class references commonly appears as a chain or a hierarchy in a heap dump, but may take other forms depending upon the specific implementation and the same are contemplated within the scope of the illustrative embodiments.

The operation can be one or more business functions, business transactions, computational operations, data transformations, or some combination thereof. For example, suppose that the application has a "authenticate user" business function in which two objects of class A are instantiated, followed by one instantiation of an object of class B, and followed by zero or more instances of objects of class C. The flow portion of the metadata defines a correspondence between the referential relationships of instantiated objects of classes A, B, and C with the execution of the "authenticate user" function. When the object hierarchy of the heap dump shows an accumulation of two objects of class A, one object of class B, and thirteen objects of class C, an analysis according to an embodiment concludes, based on the flow metadata, that the object was instantiated as a result of executing the "authenticate user" business function of the application.

As another example, suppose that the application has a "validate user access" business function in which two objects of class A are instantiated, followed by one instantiation of an object of class B, and followed by fifty or more instances of objects of class C. The flow portion of the metadata defines a correspondence between the referential relationships of instantiated objects of classes A, B, and C, a volume of the accumulation of those objects, with the execution of the "validate user access" function. When the object hierarchy of the heap dump shows an accumulation of two objects of class A, one object of class B, and seventy five objects of class C, an analysis according to an embodiment concludes, based on the referential relationships and volumes information in the flow metadata, that the object was instantiated as a result of executing the "validate user access" business function of the application.

As an example, a developer of the application can define the flow metadata at the time of developing the code of the application. The developer can refine or modify the flow portion as the code evolves later during the updates or upgrades of the application. A consultant can also define, refine, or modify the flow metadata based on the customizations of the application, such as on customer site.

Any number of flow relationships of a similar nature can be defined in the flow portion of the metadata of an application. A flow relationship can define a relationship between any number of objects in any combination and any number of operations, functions, or transactions in a similar manner.

These examples of static and flow relationships are not intended to be limiting. From this disclosure, those of ordinary skill in the art will be able to conceive many other similarly purposed and the same are contemplated within the scope of the illustrative embodiments.

An embodiment receives a heap dump and a metadata file of an application. The embodiment determines the object hierarchy present in the heap dump. The embodiment identifies a leak suspect pattern in the hierarchy.

A leak suspect pattern of objects is a pattern or referential relationship of accumulation of objects in the object hierarchy of the heap dump that is indicative of a leak. For example, the object hierarchy may show that two objects of class A were instantiated, followed by the instantiation of two objects of class B, followed by the instantiation of ten thousand objects of class C. The number of objects exceeding the threshold is an indication of a memory leak, and the referential relationship or pattern of object instantiations of classes A, B, and C forms a leak suspect pattern.

As another example, the object hierarchy may show that two objects of class A were instantiated, followed by the instantiation of two objects of class B, followed by the instantiation of fifteen objects of class C. The object hierarchy also shows that an object of class B occupied three gigabytes of memory. The higher than a threshold amount of memory space is another example indication of a memory leak, and the referential relationship or pattern of object instantiations of classes A, B, and C forms a leak suspect pattern by this reasoning.

These examples manners of identifying leak suspect patterns are not intended to be limiting. From this disclosure, those of ordinary skill in the art will be able to conceive many other ways in which to select a leak suspect pattern and the same are contemplated within the scope of the illustrative embodiments.

In some cases, the object hierarchy can include noise, such as intervening container objects, object references, platform or infrastructure services related objects, management or maintenance related objects, kernel related objects, and other objects or data that are not directly related to the application whose metadata is being used by the embodiment. Such noise can become included in a leak suspect pattern.

In such cases, the embodiment curates the leak suspect pattern, to wit, removes the noise objects from the leak suspect pattern. The embodiment uses the resulting curated leak suspect pattern to construct a search query. Particularly, the embodiment selects from the curated leak suspect pattern the objects, relationships in the object accumulations, volumes of the accumulations, or some combination thereof. The embodiment uses the selected objects, referential relationships of the object accumulations, volumes of the accumulations, or some combination thereof, in a search query to execute against the metadata.

In executing the search query against the metadata, the embodiment matches the objects, referential relationships of the object accumulations, volumes of the accumulations, or some combination thereof, as included in the search query, with one or more static and/or flow relationships in the metadata. If an object, a referential relationship in an accumulation, a volume of the accumulations, or some combination thereof from the search query, matches—above a threshold degree of matching—a corresponding object, relationship, volume, or a combination thereof in a static relationship or a flow relationship from the metadata, the embodiment deems the leak suspect pattern to have been successfully matched to the static or the flow relationship, as the case may be. Upon a match, the embodiment concludes that the leak suspect pattern is generated by the function, operation, or transaction corresponding the matched static or flow relationship.

Such a manner of identifying the possible source of the leak suspect pattern in the heap dump is especially useful to individuals who do not possess the high level of expertise or familiarity with the code of the application, as required by the prior-art. The identification of the suspect function, operation, or transaction relating to an application according to an embodiment allows rapid detection of leak suspects, without requiring the expertise or the knowledge of the code, on-site and in other locations where the application might be executing, and without the help of specifically skilled individuals.

In one embodiment, the various operations, functions, or transactions, their workflows, or a combination thereof, can be visually represented in a graphical user interface. When such a user interface is available, the embodiment causes the visual representation on the user interface to be manipulated such that the operation, function, or transaction related to the leak suspect pattern is visibly changed or highlighted on the user interface. Such a manner of visually presenting the possible source of the leak suspect pattern in the heap dump is especially useful to individuals who do not possess the high level of expertise or familiarity with the code of the application, as required by the prior-art.

A method of an embodiment described herein, when implemented to execute on a device or data processing system, comprises substantial advancement of the functionality of that device or data processing system in detecting memory leaks in a data processing system. For example, prior-art require detailed knowledge of the code of an application, familiarity with the structure and contents of heap dumps, a suitable location and equipment, and a significant amount of time to identify the source or root cause of a memory leak. An embodiment relates the heap dump to the static aspects of the application and the dynamic operational aspects of the application. An embodiment further, automatically correlates portions of the heap dump, i.e., the leak suspect patterns, with these static and flow aspects of the application. Operating in a manner described herein, an embodiment presents an application-centric analysis of the heap dump, and identifies possible source or root cause of the suspected leak. Such manner of identifying a source of a memory leak within an application is unavailable in presently available devices or data processing systems. Thus, a substantial advancement of such devices or data processing systems by executing a method of an embodiment improves the speed and accuracy of the detection, reduces the cost and skill requirement for the detection, and increases the flexibility of where and how the memory leaks can be detected and remedied.

The illustrative embodiments are described with respect to certain objects, relationships, volumes, patterns, relationships, operations, functions, transactions, applications, environments, circumstances, presentations, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments.

Furthermore, a particular illustrative embodiment may have some, all, or none of the advantages listed above.

Figure 2:
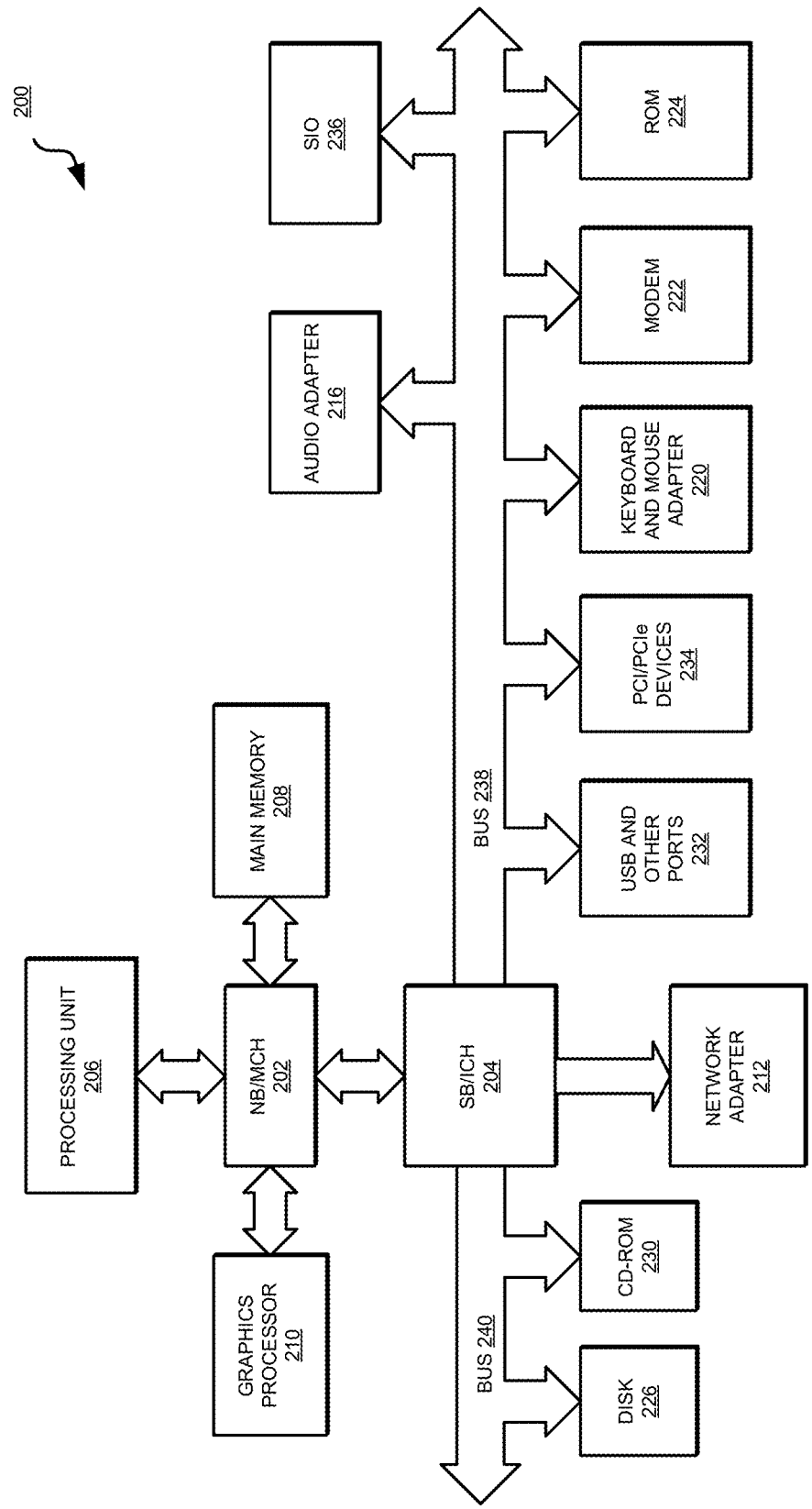
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

An embodiment described herein can be implemented in any data processing system, such as in the form of application 105 in server 104. Application 105 receives an object hierarchy of heap dump 109 from heap dump analyzer 107. Application 105 receives metadata 111 of an application (not shown) executing in data processing environment 100. Application 105 presents the results of the analysis according to an embodiment in analysis presentation 113.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

With reference to FIG. 3, this figure depicts a screenshot of an actual example heap dump using which a source of a leak in an application can be detected in accordance with an illustrative embodiment. Heap dump 300 is an example of heap dump 109 in FIG. 1.

Heap dump 300 shows an object hierarchical view of the heap dump data, for example, as generated by heap dump analyzer 107 in FIG. 1. Row 302 shows that 3,901,480,928 bytes of memory have been used by object psdi/txn/MX-TransactionImpl$TransactableInfo. Where the memory usage of this object was almost zero percent (304) earlier, in row 302, the usage has jumped to over ninety percent (306), giving rise to a suspicion of a memory leak.

As is evident, using heap dump 300 in this form is difficult. Analyzing this data and identifying a source of the leak requires understanding of these cryptic objects and their related data in heap dump 300. Still, disadvantageously, there is no readily available information in heap dump 300 to point the leak investigation towards a particular application or a function thereof.

Figure 4:
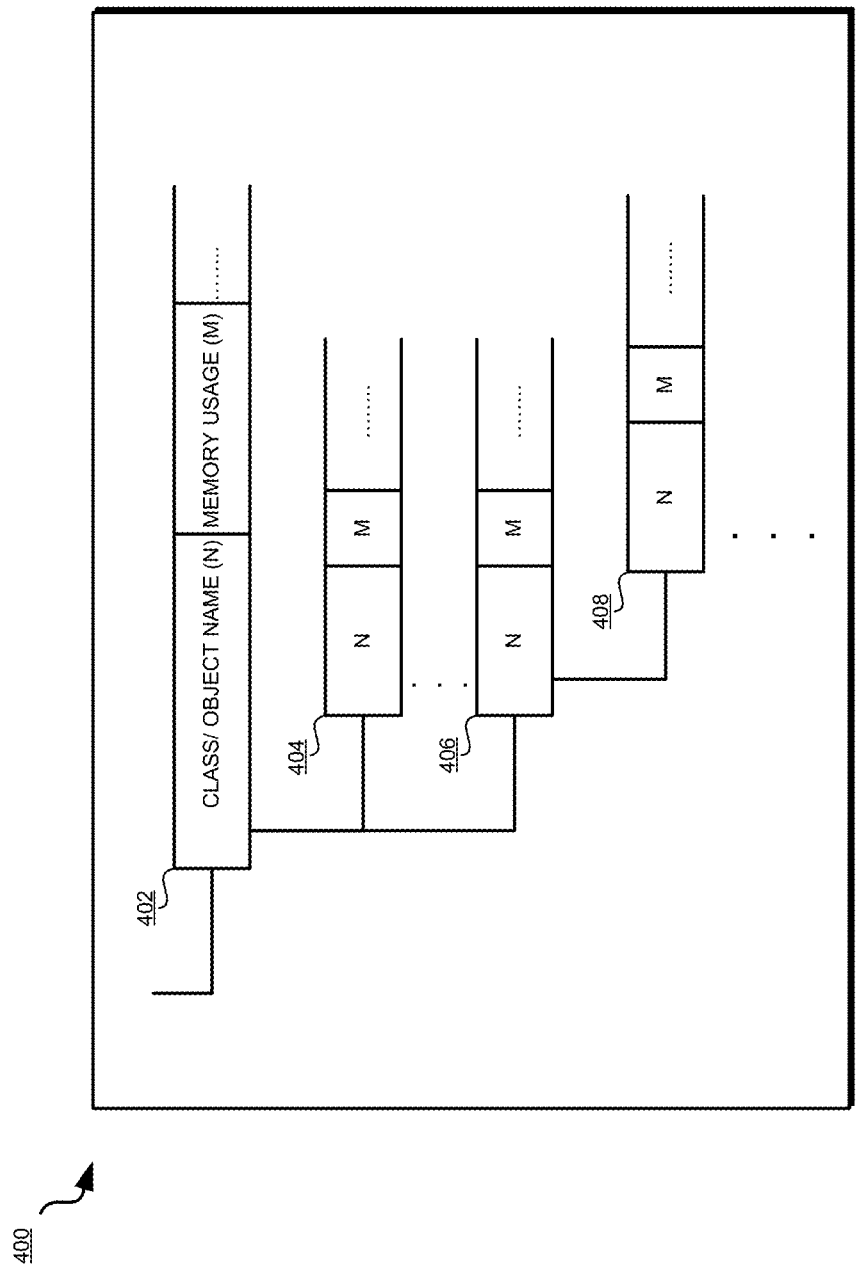
FIG. 4 depicts a block diagram of a simplified generic structure of an object hierarchy of a heap dump as used for application-centric analysis of leak suspect operations in accordance with an illustrative embodiment.

With reference to FIG. 4, this figure depicts a block diagram of a simplified generic structure of an object hierarchy of a heap dump as used for application-centric analysis of leak suspect operations in accordance with an illustrative embodiment. Object hierarchy 400 can be derived or constructed from a heap dump, such as heap dump 300 in FIG. 3, using heap dump analyzer 107 in FIG. 1.

An embodiment, such as an embodiment implemented in application 105 in FIG. 1, detects one or more nodes, such as node 402, in hierarchy 400. Node 402 includes at least a name or an identifier (labeled "N") of an object and an amount of memory (labeled "M") used at the node.

In a similar manner, hierarchy 400 includes any number of nodes similar to node 402. For example, nodes 404 to 406 are children nodes of node 402, and represent their respective memory usages and object identifiers. Node 408 and other such nodes are children nodes of node 406, and represent their respective memory usages and object identifiers.

An order or arrangement of the nodes in a hierarchy below and up to a node, and the objects represented therein, is usable to establish a pattern of accumulation in the heap dump. A number of the nodes in a hierarchy below and up to a node is usable to establish a volume of accumulation in the heap dump.

Figure 5:
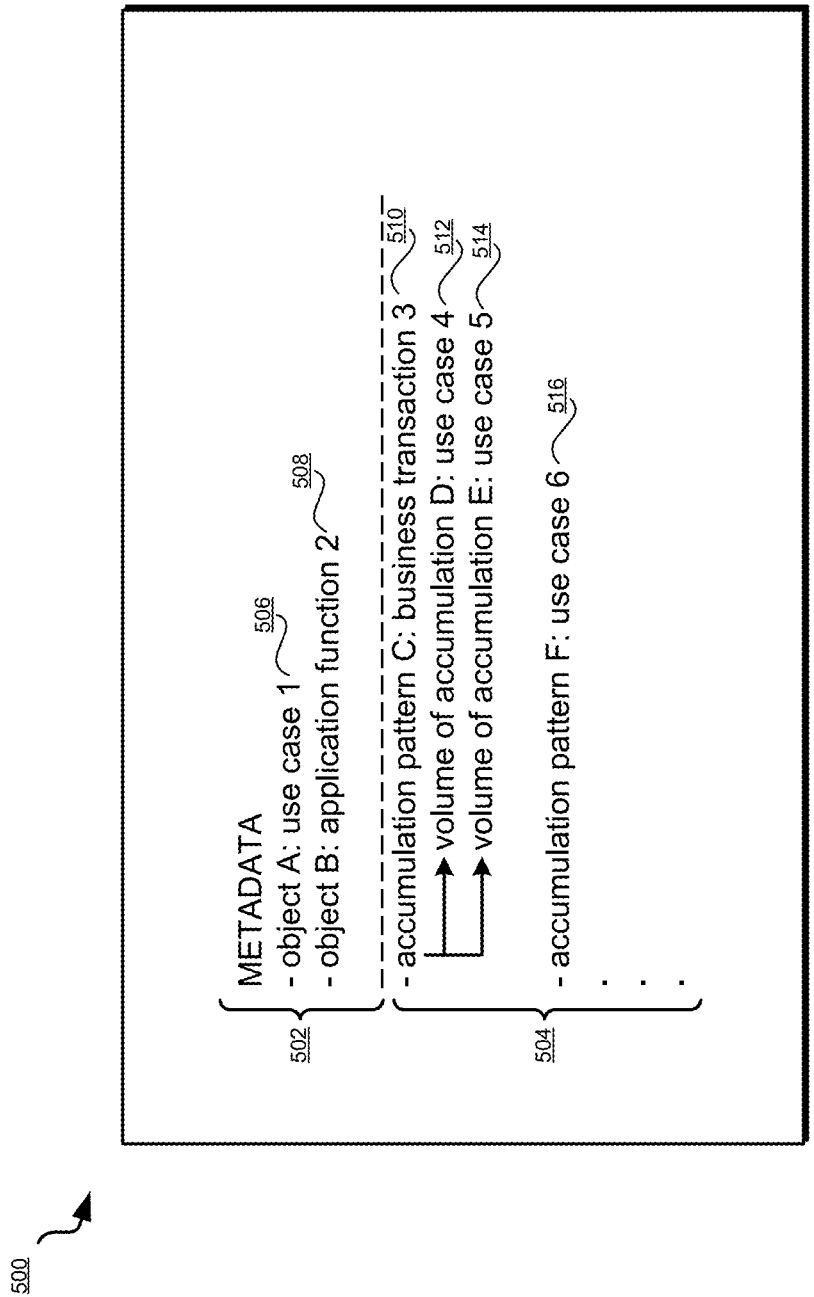
FIG. 5 depicts a block diagram of an example metadata usable for application-centric analysis of leak suspect operations in accordance with an illustrative embodiment.

With reference to FIG. 5, this figure depicts a block diagram of an example metadata usable for application-centric analysis of leak suspect operations in accordance with an illustrative embodiment. Metadata 500 is an example of metadata 111 in FIG. 1.

Section 502 includes the static relationships, or correlations, between class names and application functions. As described in this disclosure, this section describes a correlation between the instantiation of an object of a particular class and the invocation of a particular function of an application. For example, entry 506 in section 502 describes that an instantiation of an object of class A indicates a particular manner of using a feature of the application, e.g., use-case 1. As another example, entry 508 in section 502 describes that an instantiation of an object of class B indicates an invocation of a function of the application, e.g., application function 2.

Any number of entries can be made in section 502 in a similar manner. Furthermore, section 502 can be a separate file within the scope of the illustrative embodiments. These examples of the types of the entries in static section 502 are not intended to be limiting. From this disclosure, those of ordinary skill in the art will be able to conceive many other types of similarly purposed entries in the static section of a metadata, and the same are contemplated within the scope of the illustrative embodiments.

Section 504 includes the dynamic relationships, or flow correlations, between referentially related class instantiations and an operation of an application. As described in this disclosure, this section describes a correlation between (i) an accumulation pattern, an accumulation volume, or both, of a combination of objects, and (ii) an operation of an application in a particular manner or for a particular purpose. For example, entry 510 in section 504 describes that pattern C of accumulation of objects in the heap dump indicates the performing of a particular business transaction, e.g., business transaction 3, using the application.

As another example, entry 510 in section 504 describes that the presence of pattern C with a volume of accumulation D indicates that the business transaction 3 was performed according to use-case 4. Similarly, entry 512 in section 504 describes that the presence of pattern C with a volume of accumulation E indicates that the business transaction 3 was performed according to use-case 5. Likewise, entry 514 in section 504 describes that the presence of accumulation pattern F in the heap dump indicates the execution of use-case 6 using the application.

Any number of entries can be made in section 504 in a similar manner. Furthermore, section 504 can be a separate file within the scope of the illustrative embodiments. These examples of the types of the entries in flow section 504 are not intended to be limiting. From this disclosure, those of ordinary skill in the art will be able to conceive many other types of similarly purposed entries in the flow section of a metadata, and the same are contemplated within the scope of the illustrative embodiments.

With reference to FIG. 6, this figure depicts a flowchart of an example process for application-centric analysis of leak suspect operations in accordance with an illustrative embodiment. Process 600 can be implemented in application 105 in FIG. 1.

The application receives a heap dump file, such as a file containing heap dump object hierarchy 400 of FIG. 4 (block 602). The application receives a metadata file, such as metadata file 500 of FIG. 5 (block 604).

The application parses the heap dump file to construct a leak suspect pattern (block 606). The application curates the leak suspect pattern, as may be needed given the implementation-specific and circumstances-specific heap dump data (block 608). The application forms a search query from the curated leak suspect pattern (block 610).

The application determines whether the search query matches, exceeding a threshold degree of matching, in the metadata (block 612). If no satisfactory match is found ("No match" path of block 612), the application proceeds to an alternate analysis method (block 613) and exits process 600 thereafter. As an example, the alternate analysis process may include notifying a user to proceed with a prior-art method of detecting a memory leak using the heap dump.

If a match is found in the static section of the metadata ("Static match" path of block 612), the application identifies the application function or use-case identified in the matching entry of the static section of the metadata (block 514). The application progresses process 600 to block 620 thereafter.

If a match is found in the flow section of the metadata ("Flow/pattern match" path of block 612), the application identifies the application function, business operation, transaction, or use-case identified in the matching entry of the flow section of the metadata (block 616). In some cases, more than one entry may satisfy the threshold degree of matching. In such cases, as an example, the application may select a matching entry from the several matching entries by further considering the volume of the accumulation in the matching (block 618).

The application represents the leak suspect pattern in terms of the application function, business operation, transaction, or use-case identified in the matching entry or the selected matching entry (block 620). In one embodiment, the application selects a portion of the code of the application, where the portion corresponds to the application function, business operation, transaction, or use-case identified in the matching entry. The application passes the portion of the code to a code manipulation tool where the portion of the code can be modified to resolve the leak.

The application, optionally, graphically presents the leak representation of block 620, such as by manipulating a visual representation of the application on a user interface (block 622). The application ends process 600 thereafter.

Thus, a computer implemented method, system or apparatus, and computer program product are provided in the illustrative embodiments for application-centric analysis of leak suspect operations. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for identifying a source of a memory leak in an application, the method comprising:
    identifying a pattern of objects in an object hierarchy of a heap dump, the pattern including an indication of the memory leak;
    matching, using a processor and a memory, the pattern with a metadata of the application, wherein a static entry in a static section of the metadata describes a relationship between a component of the application and an object of a class used in the component, wherein a flow entry in a flow section of the metadata describes a relationship between a pattern of instantiation of a set of objects corresponding to a set of classes and an operation performed using the application;
    concluding, when the pattern matches the flow entry in the flow section of the metadata, that the memory leak is caused in the operation identified in the flow entry;
    selecting a portion of a code of the application for modification, wherein the portion of the code participates in the operation identified in the flow entry;
    forming a curated pattern by removing from the pattern a first object; and
    retaining in the curated pattern a second object from the pattern, wherein the first object is of a class not used in the application and the second object is of a class used in the application.

2. The method of claim 1, further comprising:
    determining that the pattern matches a plurality of flow entries in the flow section of the metadata, the plurality of flow entries including the flow entry and a second flow entry;
    determining a volume of accumulation of objects in the pattern;
    matching the volume of accumulation of objects with a first volume specified in the flow entry and a second volume specified in the second flow entry; and
    concluding, responsive to the volume of accumulation of objects in the pattern matching the second volume, that the memory leak is caused in a second operation identified in the second flow entry.

3. The method of claim 2, wherein the second volume is a second range of volumes, further comprising:
    evaluating, as a part of matching the volume of accumulation of objects, whether the volume of accumulation of objects is within the second range of volumes.

4. The method of claim 1, further comprising:
    matching a second pattern with the metadata; and
concluding, when the second pattern matches the static entry in the static section of the metadata, that the memory leak is caused in the component identified in the static entry.

5. The method of claim 1, further comprising:
    analyzing a heap dump data to form the object hierarchy of the heap dump; and
determining a node in the object hierarchy where a memory usage exceeds a threshold memory usage, the indication of the memory leak comprising the memory usage exceeding the threshold memory usage at the node.

6. The method of claim 1, further comprising:
    replacing the pattern with the curated pattern, wherein the matching the pattern comprises matching the curated pattern.

7. The method of claim 1, further comprising:
    modifying, on a user interface, a visual presentation of the portion of the code, wherein the modifying is responsive to the code participating in the operation identified in the flow entry.

8. A computer usable program product comprising a computer readable storage device including computer usable code for identifying a source of a memory leak in an application, the computer usable code comprising:
    computer usable code for identifying a pattern of objects in an object hierarchy of a heap dump, the pattern including an indication of the memory leak;
    computer usable code for matching, using a processor and a memory, the pattern with a metadata of the application, wherein a static entry in a static section of the metadata describes a relationship between a component of the application and an object of a class used in the component, wherein a flow entry in a flow section of the metadata describes a relationship between a pattern of instantiation of a set of objects corresponding to a set of classes and an operation performed using the application;
    computer usable code for concluding, when the pattern matches the flow entry in the flow section of the metadata, that the memory leak is caused in the operation identified in the flow entry;

computer usable code for selecting a portion of a code of the application for modification, wherein the portion of the code participates in the operation identified in the flow entry;

computer usable code for forming a curated pattern by removing from the pattern a first object; and computer usable code for retaining in the curated pattern a second object from the pattern, wherein the first object is of a class not used in the application and the second object is of a class used in the application.

9. The computer usable program product of claim 8, further comprising:

computer usable code for determining that the pattern matches a plurality of flow entries in the flow section of the metadata, the plurality of flow entries including the flow entry and a second flow entry;

computer usable code for determining a volume of accumulation of objects in the pattern;

computer usable code for matching the volume of accumulation of objects with a first volume specified in the flow entry and a second volume specified in the second flow entry; and computer usable code for concluding, responsive to the volume of accumulation of objects in the pattern matching the second volume, that the memory leak is caused in a second operation identified in the second flow entry.

10. The computer usable program product of claim 9, wherein the second volume is a second range of volumes, further comprising:

computer usable code for evaluating, as a part of matching the volume of accumulation of objects, whether the volume of accumulation of objects is within the second range of volumes.

11. The computer usable program product of claim 8, further comprising:

computer usable code for matching a second pattern with the metadata; and computer usable code for concluding, when the second pattern matches the static entry in the static section of the metadata, that the memory leak is caused in the component identified in the static entry.

12. The computer usable program product of claim 8, further comprising:

computer usable code for analyzing a heap dump data to form the object hierarchy of the heap dump; and computer usable code for determining a node in the object hierarchy where a memory usage exceeds a threshold memory usage, the indication of the memory leak comprising the memory usage exceeding the threshold memory usage at the node.

13. The computer usable program product of claim 8, further comprising:

computer usable code for replacing the pattern with the curated pattern, wherein the matching the pattern comprises matching the curated pattern.

14. The computer usable program product of claim 8, further comprising:

computer usable code for modifying, on a user interface, a visual presentation of the portion of the code, wherein the modifying is responsive to the code participating in the operation identified in the flow entry.

15. The computer usable program product of claim 8, wherein the computer usable code is stored in a computer readable storage device in a data processing system, and wherein the computer usable code is transferred over a network from a remote data processing system.

16. The computer usable program product of claim 8, wherein the computer usable code is stored in a computer readable storage device in a server data processing system, and wherein the computer usable code is downloaded over a network to a remote data processing system for use in a computer readable storage device associated with the remote data processing system.

17. A data processing system for identifying a source of a memory leak in an application, the data processing system comprising:

a storage device, wherein the storage device stores computer usable program code; and a processor, wherein the processor executes the computer usable program code, and wherein the computer usable program code comprises:

computer usable code for identifying a pattern of objects in an object hierarchy of a heap dump, the pattern including an indication of the memory leak;

computer usable code for matching, using a processor and a memory, the pattern with a metadata of the application, wherein a static entry in a static section of the metadata describes a relationship between a component of the application and an object of a class used in the component, wherein a flow entry in a flow section of the metadata describes a relationship between a pattern of instantiation of a set of objects corresponding to a set of classes and an operation performed using the application;

computer usable code for concluding, when the pattern matches the flow entry in the flow section of the metadata, that the memory leak is caused in the operation identified in the flow entry;

computer usable code for selecting a portion of a code of the application for modification, wherein the portion of the code participates in the operation identified in the flow entry;

computer usable code for forming a curated pattern by removing from the pattern a first object; and computer usable code for retaining in the curated pattern a second object from the pattern, wherein the first object is of a class not used in the application and the second object is of a class used in the application.

18. The data processing system of claim 17, further comprising:

computer usable code for determining that the pattern matches a plurality of flow entries in the flow section of the metadata, the plurality of flow entries including the flow entry and a second flow entry;

computer usable code for determining a volume of accumulation of objects in the pattern;

computer usable code for matching the volume of accumulation of objects with a first volume specified in the flow entry and a second volume specified in the second flow entry; and computer usable code for concluding, responsive to the volume of accumulation of objects in the pattern matching the second volume, that the memory leak is caused in a second operation identified in the second flow entry.

\* \* \* \* \*